March 15, 1966 C. Z. MONROE ETAL 3,239,995
MACHINE FOR FORMING, FILLING, CLOSING AND SEALING PLASTIC
COATED PAPERBOARD CONTAINERS
Filed June 7, 1961 8 Sheets-Sheet 2

INVENTORS.
Charles Z. Monroe
Harry B. Egleston
BY Wolfe, Hubbard, Voit + Osann
ATTORNEYS.

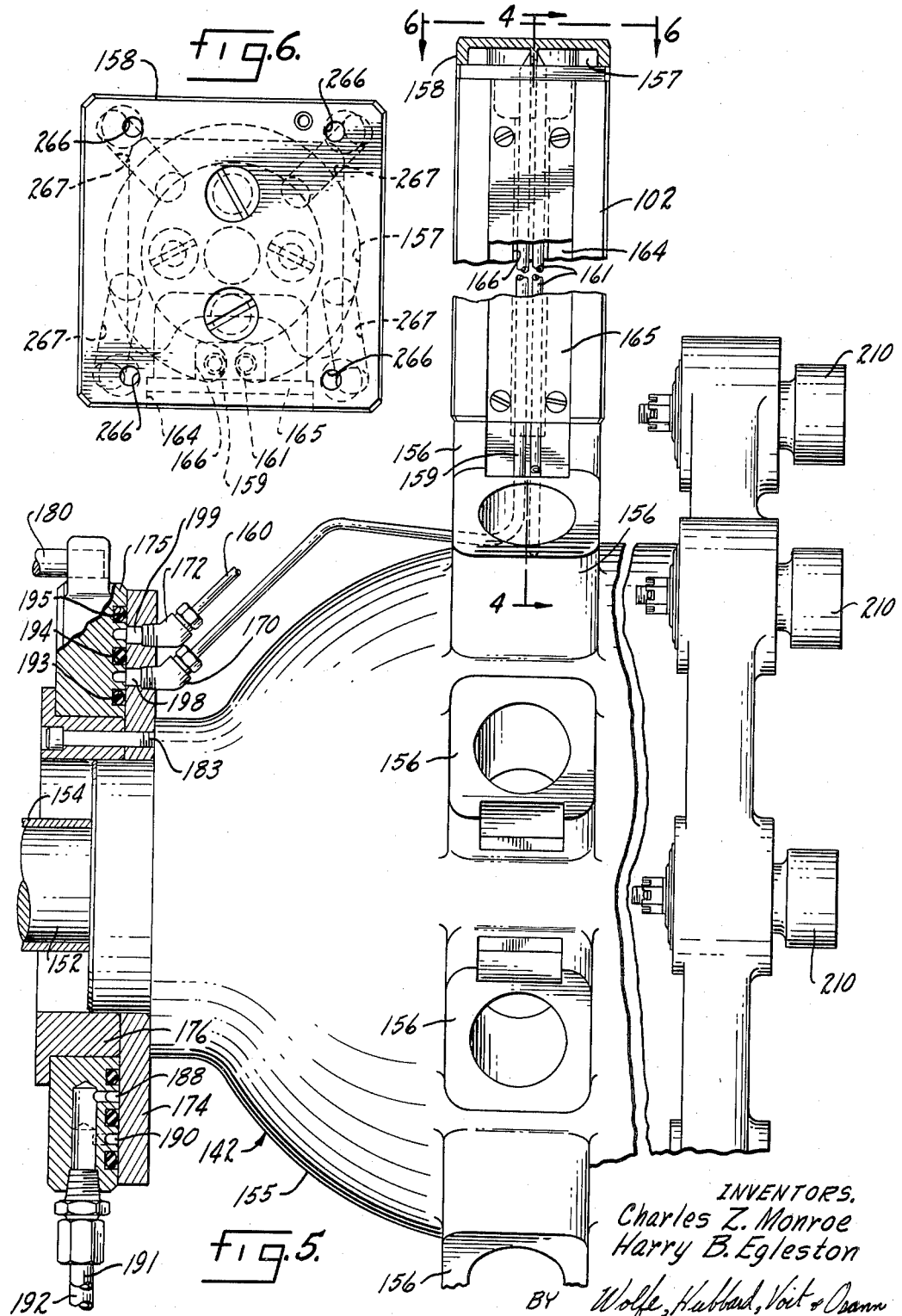

INVENTORS.
Charles Z. Monroe
Harry B. Egleston
BY Wolfe, Hubbard, Voit & Osann
ATTORNEYS.

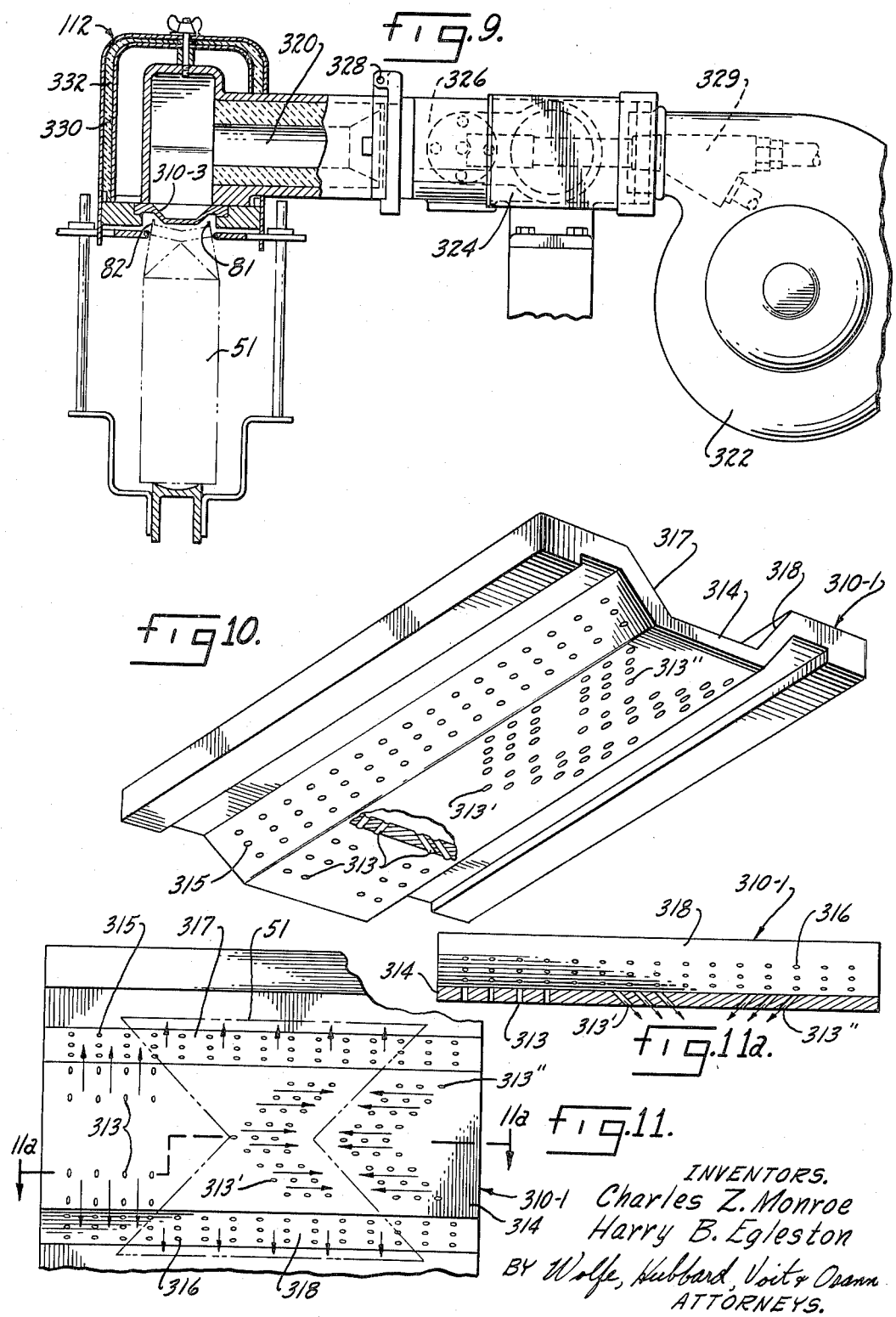

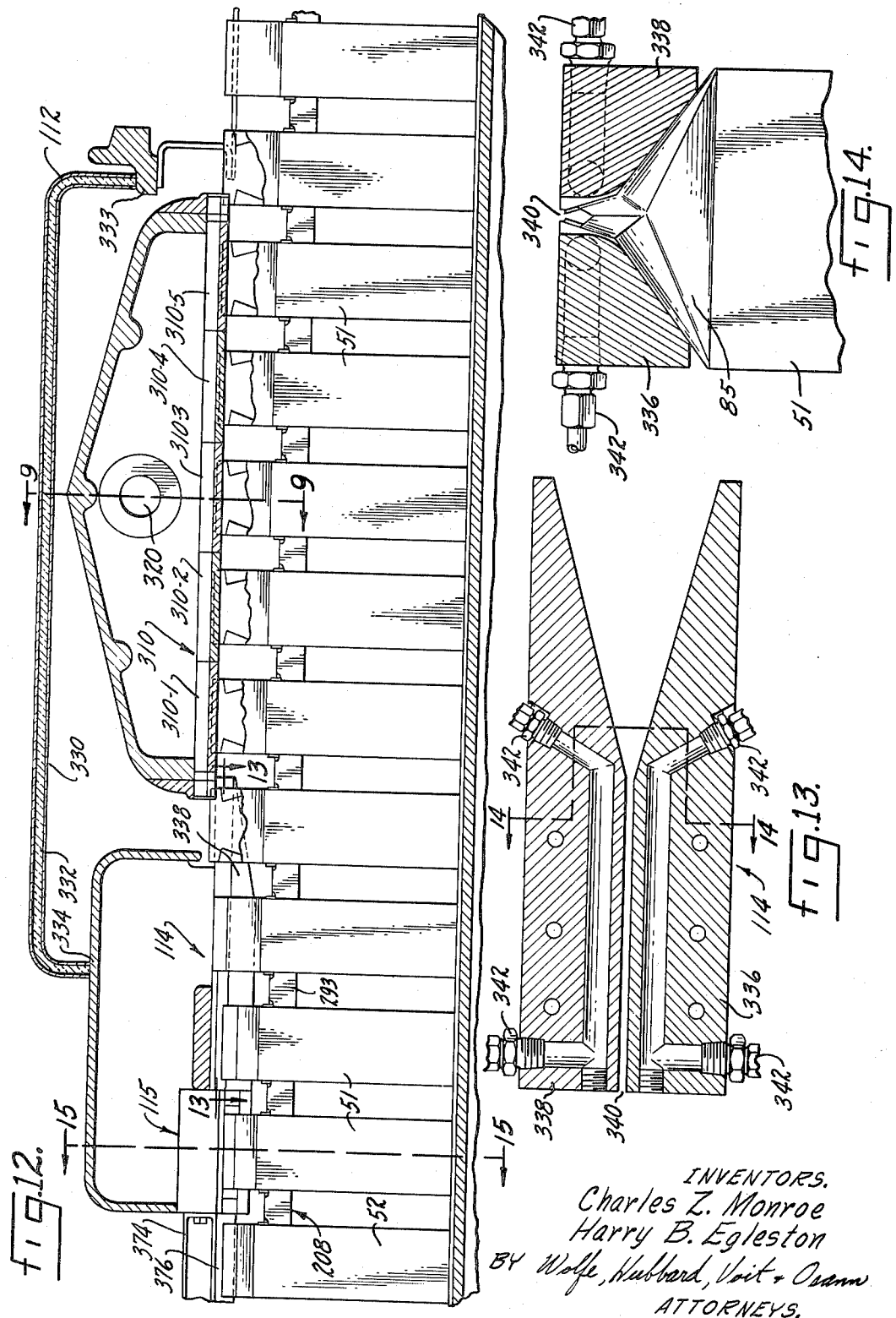

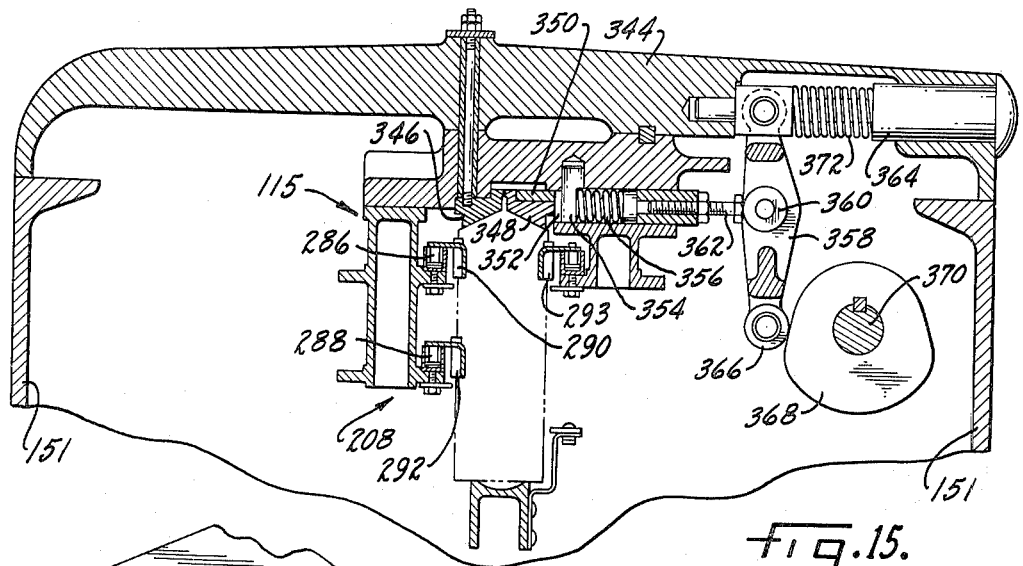
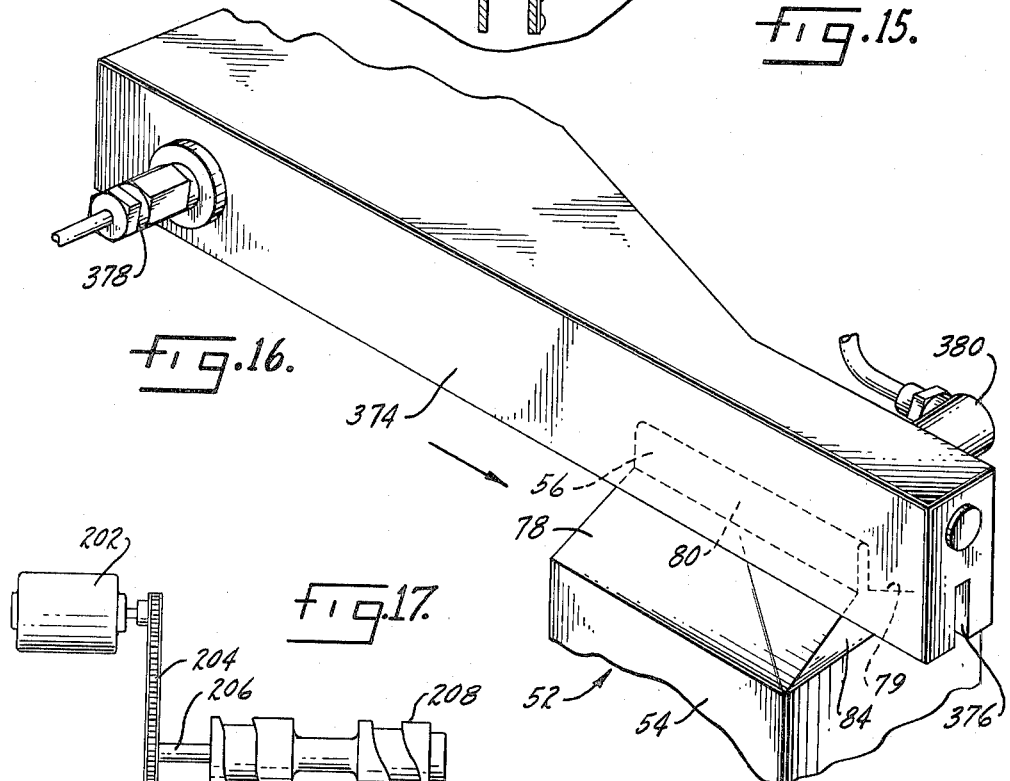
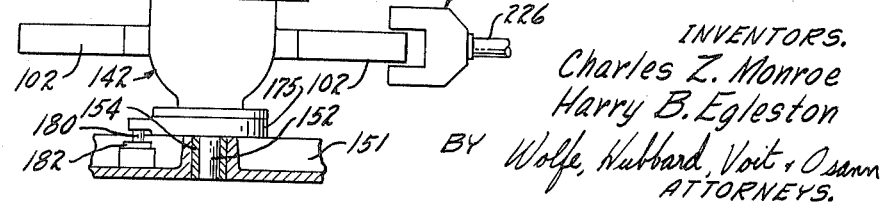

United States Patent Office 3,239,995
Patented Mar. 15, 1966

3,239,995
MACHINE FOR FORMING, FILLING, CLOSING AND SEALING PLASTIC COATED PAPERBOARD CONTAINERS
Charles Z. Monroe, Detroit, and Harry B. Egleston, Livonia, Mich., assignors to Ex-Cell-O Corporation, Detroit, Mich., a corporation of Michigan
Filed June 7, 1961, Ser. No. 115,367
5 Claims. (Cl. 53—375)

The present invention relates to packaging machines and, more specifically, to improvements in machines for forming, filling, closing and sealing plastic coated gable top containers of paperboard or the like. The machine finds particular, but not exclusive, utility in producing filled and sealed cartons from flat collapsed blanks of paperboard or the like having a thermoplastic moistureproof coating on their inner and outer surfaces.

One illustrative form of carton adapted to be processed by the machine disclosed and claimed herein is shown in Egleston et al. copending application Serial No. 707,259, filed in the United States Patent Office on January 6, 1958, now abandoned. More detailed information on such carton may, of course, be had upon direct reference to such application. For present purposes, however, it will suffice to note that the container or carton disclosed therein is made of high grade paperboard stock coated on both sides with a thermoplastic material such as polyethylene. The polyethylene coating on the paperboard is utilized not only as a moistureproofing material but also serves as a heat and pressure sensitive adhesive which cooperates in sealing the closure elements of the container so as to make a fluidtight package. Because sealing involves the application of considerable heat and pressure, suitable precautions must be taken to avoid damaging the polyethylene coating as the cartons are erected and sealed. Major reasons for this are the relatively low melting point of polyethylene and its tendency to stick to heated surfaces.

One object of the present invention is to provide a machine for erecting and filling cartons of thermoplastic coated paperboard or the like which is remarkably simple in organization and operation, occupies a relatively small amount of floor space, and is capable of high-speed operations with the smaller, hard-to-handle cartons.

Another object of the inventon is to provide a machine of the character set forth and which will be adapted to the exclusive use of gas heaters to fuse and seal the coated top and bottom closure elements of the carton by utilizing the thermoplastic coating as an adhesive without damaging the moistureproof integrity of the thermoplastic coating.

Another object is to provide a machine of the foregoing type in which the filler and the top closure steepling and sealing mechanisms are arranged to perform their respective operations on each carton while the latter moves through the machine following a short straight path.

A further object is to provide for such machines an improved means for conducting cooling fluid through the hub of a rotary mandrel assembly supporting cartons for bottom closure forming operations and to the carton closure part contacting elements of the mandrels.

Other objects and advantages will become apparent in the light of the following detailed description, taken together with the accompanying drawings, wherein:

FIG. 2a is a flattened tubular blank constructed from the blank shown in FIG. 2;

FIG. 2b is a perspective view of a squared out tubular blank;

FIG. 2c is a perspective view of a sealed carton;

FIG. 4 is a fragmentary sectional view taken in the plane of lines 4—4 in FIG. 5 of the mandrel wheel assembly detailing the cooling fluid conduit arrangement;

FIG. 5 is an enlarged fragmentary transverse sectional view taken in the plane of lines 5—5 in FIG. 3 showing a portion of the mandrel wheel assembly and the hub thereof;

FIG. 6 is an enlarged elevational view showing the end of one mandrel element taken in the plane of the line 6—6 in FIG. 5;

FIG. 9 is a fragmentary vertical sectional view with parts in elevation showing the top closure heater of the machine;

FIG. 10 is a bottom perspective view of one heater head plate;

FIG. 11 is a partial top plan view of one heater head plate diagrammatically showing how the air streams are directed against a container top closure shown in phantom lines;

FIG. 11a is a vertical sectional view taken in the plane of lines 11a—11a in FIG. 11 showing the angular relationship of certain air stream passages;

FIG. 12 is an enlarged fragmentary longitudinal vertical sectional view through the heater and sealer sections of the machine;

FIG. 13 is an enlarged horizontal sectional view taken in the plane of lines 13—13 in FIG. 12 of the set of sealing elements of the sealer section of FIG. 12;

FIG. 14 is an enlarged transverse vertical sectional view taken in the plane of lines 14—14 in FIG. 13;

FIG. 15 is a transverse vertical sectional view through the sealer section taken in the plane of lines 15—15 in FIG. 12;

FIG. 16 is a perspective view of the sealer section head showing the connections for conducting cooling fluid thereto; and FIG. 17 is a diagrammatic view presenting a plan view of the drive system of the machine.

Figure 1:
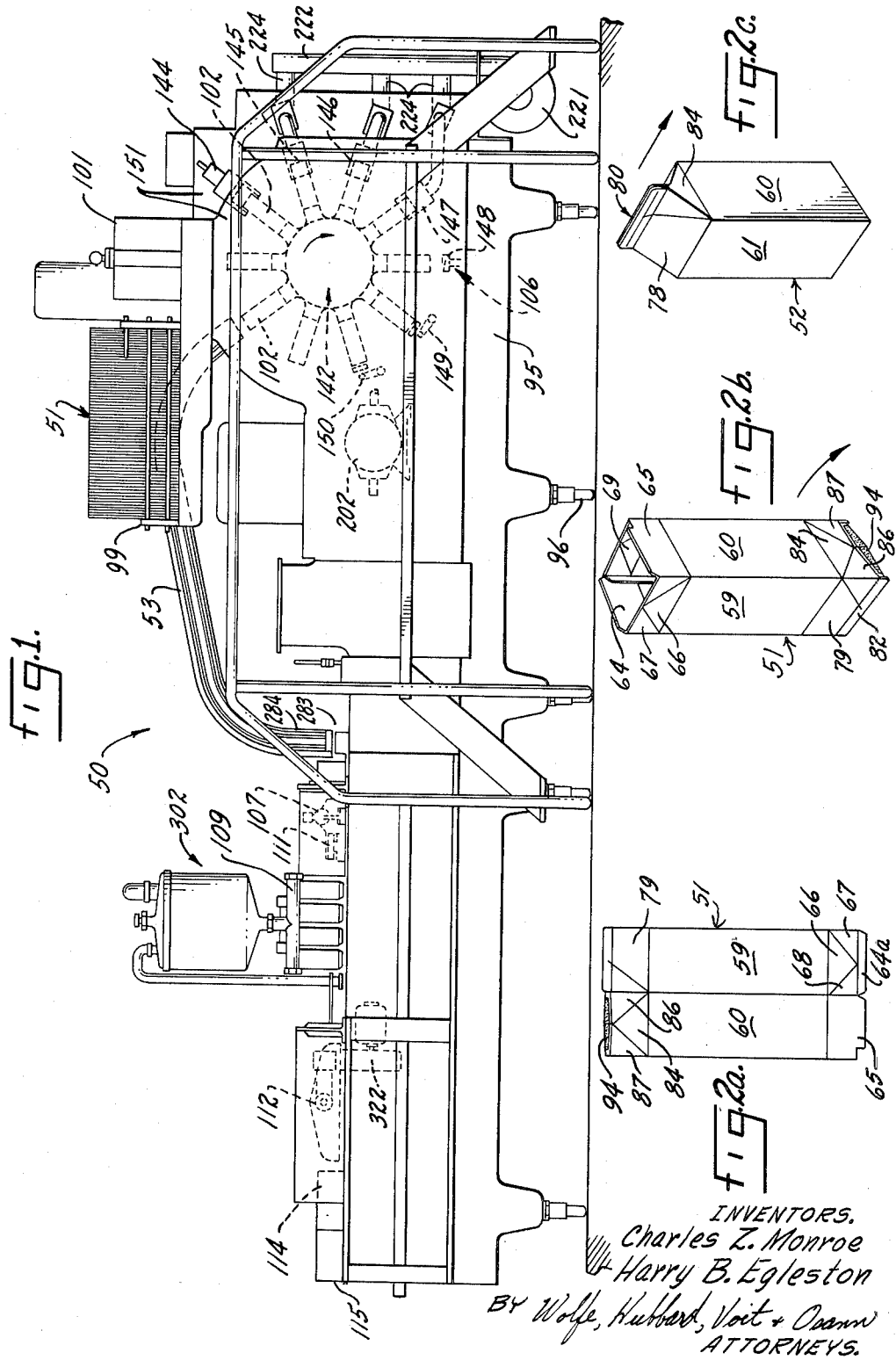
FIGURE 1 is a side elevational view of an illustrative carton forming machine embodying the present invention.

While the invention is susceptible of various modifications and alternative constructions, certain illustrative embodiments have been shown in the drawings and will be described below in considerable detail. It should be understood, however, that there is no intention to limit the invention to the specific forms disclosed, but, on the contrary, the intention is to cover all modifications, alternative constructions and equivalents falling within the spirit and scope of the invention as expressed in the appended claims.

Referring more specifically to FIG. 1, the invention is there exemplified in an illustrative machine 50 adapted to receive a supply of flattened tubular blanks 51 such as shown in FIG. 2a, process them automatically at high speed, and to discharge them in the form of filled and sealed cartons 52, FIG. 2c. Before presenting a detailed description of the machine 50, however, it would be desirable to outline briefly the salient features of the carton blank 51 and the carton 52 processed by the machine 50.

Figure 2:
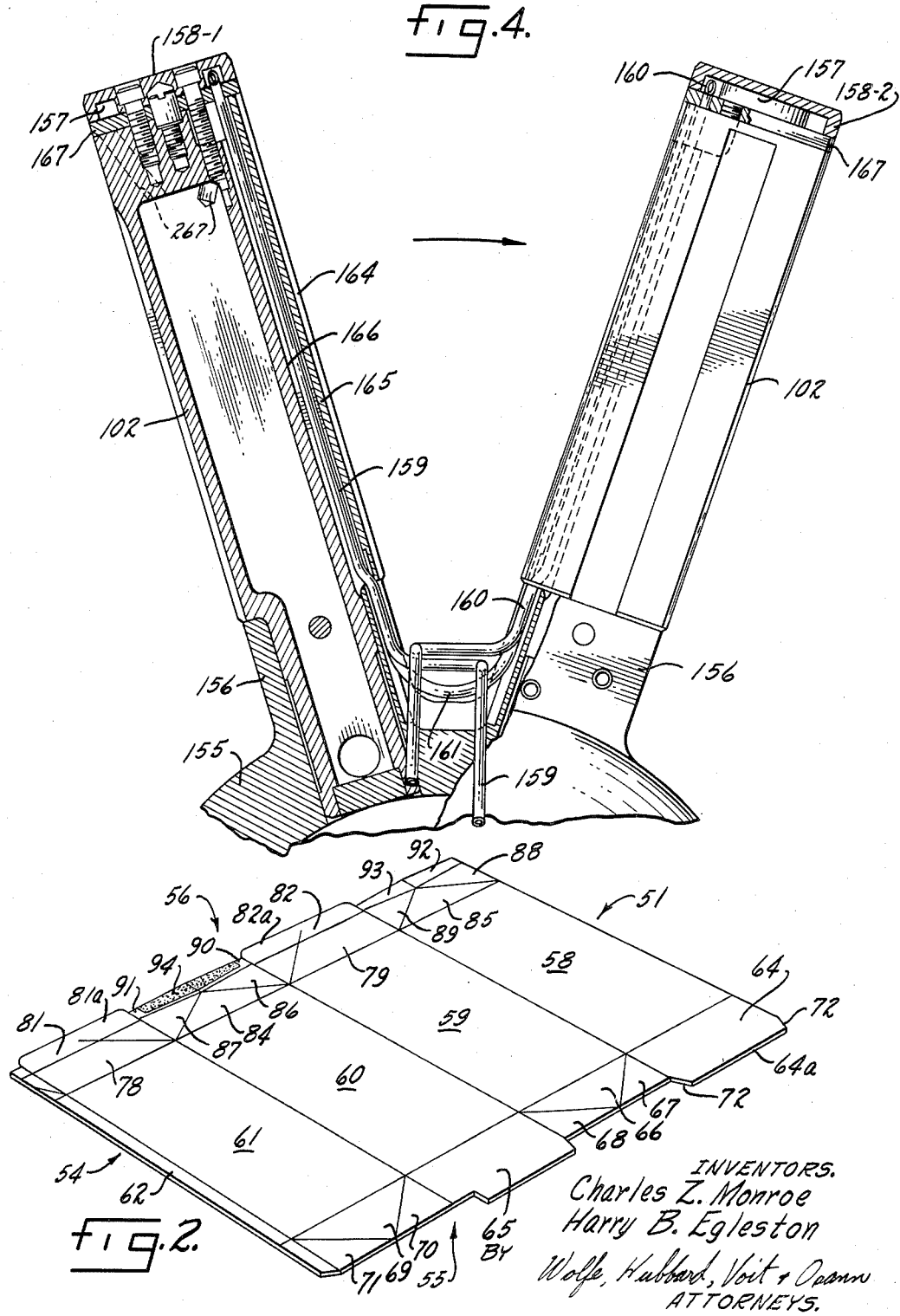
FIG. 2 is a plan view of a flat carton blank.

A flattened tubular blank 51 (FIG. 2a) is formed from a flat blank of paperboard or the like (FIG. 2) coated on both sides with thermoplastic material such as polyethylene, by folding the flat blank together and gluing the side seam. Each flattened tubular blank 51 is squared out at a squaring station until it is truly tubular in shape, as shown in FIG. 2b. The completed carton 52, shown in FIG. 2c, comprises a tubular body 54 of generally rectangular cross section having a bottom closure 55 and a top closure 56. Both the top and bottom closures are formed from integral extensions of the carton body and are held and sealed together in a manner which takes full advantage of the properties of the thermoplastic coating on the carton material.

The carton blank is divided by means of an appropriate pattern of score lines into a plurality of panels and areas which are utilized for the walls and the closure parts of the carton. Upon reference to FIG. 2, which illustrates the blank, it will be noted that the body portion of the carton is defined by four side panels 58, 59, 60, 61 and a side seam flap 62 which is adapted to be adhesively secured to the inner face of the side panel 58.

The bottom closure 55 is defined in part by a pair of major bottom panels 64, 65 which are integral extensions of alternate side panels 58, 60, and in part by a plurality of minor triangular panels 66, 67, 68 and 69, 70, 71 which are integral extensions of alternate side panels 59, 61. All of the bottom closure panels are integral parts of the blank and adjacent ones are separated from each other only by score lines which ultimately define the various folds or creases required to complete formation of the bottom closure. When the bottom closure is formed, the triangular panels 66, 69 fold inwardly toward one another and the respective pairs of smaller triangular panels associated with them fold back against the inner faces of the major bottom panels 64, 65. The projecting lateral edges 72 of the panel 64 are chamfered slightly, defining in the projecting portion of the panel 64 a tuck-in flap 64a which is inserted between the inner face of the major bottom panel 65 and the triangular foldback panels 68, 70 which tend to fold back toward the inner face of the panel 65. The bottom closure parts, when fully infolded, are pressed flat and heat sealed in this position.

The top closure 56 (FIGS. 2c, 16) has substantially a gable top configuration comprising a pair of inclined roof panels 78, 79 surmounted by an upstanding top rib 80, defined in part by rib panels 81, 82. Interposed between the roof panels are triangular end panels 84, 85 each connected respectively to a pair of triangular foldback panels 86, 87 and 88, 89. Each pair of foldback panels is also connected to a corresponding pair of inner rib panels 90, 91 and 92, 93.

The top closure of the carton 52 also includes an extensible pouring spout which, in this instance, happens to be defined by triangular end panel 84, foldback panels 86, 87 and inner rib panels 90, 91. Initially, the spout is disposed in tucked-in condition within the top closure and protectively sealed by means of sealing panels 81a, 82a which are abuttingly secured together along the entire length of the top rib. To facilitate easy opening of the carton 52 and accessibility of the pouring spout, the pouring edges of the latter, together with the major areas of the inner rib panels 90, 91, may be covered with a patch or lip 94 of adhesive or non-adhesive material. By this is meant material which will not bond to itself or to the thermoplastic coating on the surfaces of the blank during heat sealing of the top closure. Consequently, upon application of upward and outward thumb pressure to the infolded triangular panels 86, 87 under the inclined roof panels 78, 79, the bond between certain carton panels becomes torn of fractured to spring the spout into its outwardly extending position ready for pouring. The bonded areas broken are between: (1) panels 81a and 82a over panels 90 and 91; (2) the outer face of rib panels 90 and 91 not covered by the adhesive material; (3) the inner faces of panels 91 and 81; and (4) the inner faces of panels 90 and 82.

*General machine organization*

Referring more particularly to FIG. 1, the illustrative machine 50 is especially suited to the high speed erection and filling of the smaller cartons such as the quart or pint size which have, of course, the same cross sectional area. A supply of flat side seamed blanks for such cartons is stacked in a magazine from which the blanks are successively withdrawn, erected into open-ended tubular form and loaded top first straight down onto mandrels 102 of a multi-station bottom forming rotary mandrel assembly on which the bottom closures are formed and sealed as the rotary mandrel assembly is indexed through its stations. Following the formation of the bottom closures, the semi-formed cartons are successively ejected from the mandrels and conveyed bottom first along a tubular trackway 53 defined by spaced parallel strips, being inverted in the course of such movement to arrive upright at a conveyor. The cartons are then transferred along a straight path through the machine to top breaker and steepler mechanisms, resulting in breaking or flexing of the top closure elements about their score lines, a filler mechanism, and then beneath top heater, closer and sealer units which activate the thermoplastic and seal the top closure elements. Following this, the filled and sealed cartons are discharged in a continuous procession from the machine. For convenience, the partially completed cartons will be designated by the reference numeral 51 at their various stages of completion in the machine, and by the numeral 52 upon emergence from the machine as a finished product.

The machine 50 comprises a machine base 95 supported on legs 96 and supplied with utilities such as electric power, compressed air, gas fuel and cooling water from appropriate external sources. A magazine 99 is mounted on top of the right end of the machine as viewed in FIG. 1. Operatively associated with the magazine and adjacent to it is a loader mechanism 101 which may be of any suitable conventional type. The feeder and loader mechanisms 101 (FIG. 1) are adapted to withdraw blanks successively from the magazine, erect them into open-ended tubular form, and then load them into the rotary mandrel assembly for bottom closing. For such purpose, these mechanisms are driven in synchronism with each other from the main drive of the machine.

A rotary mandrel assembly with a plurality of mandrels 102 to which the blanks are transferred by the loader 101 after erected into tubular form is situated below the loader 101, being found within an appropriate protective enclosure. The rotary mandrel assembly and associated bottom closure forming mechanism 106 is adapted to receive blanks successively from the loader 101, top down, and to move them from station to station in an orbital path to form their bottom closure. The blanks are then ejected and presented upright to a top breaker unit 107 on top of the machine base. From this point on, the cartons remain above the top of the machine base and are moved by the main chain type conveyor 108 in a horizonal straight path through the machine.

The main conveyor presents the open top cartons to the filler unit 109. The latter fills the cartons successively.

The main conveyor 108 thereupon moves the filled cartons, still open at the top, under stationary top heater and closer units 112, 114. From here, the filled and closed cartons are transferred to a top sealer unit 115. Upon final sealing of the latter, the filled and completed cartons are stamped by the pressure jaws, if needed, and discharged from the machine.

*Rotary mandrel assembly*

For bottom closure forming, the tubular blank 51 is loaded on a mandrel 102 of an intermittently driven mandrel assembly 142 carrying a plurality of such radially disposed mandrels, in this instance ten in number, and a plurality of cooperating station units with which the mandrels are adapted to register sequentially during the course of their intermittent or indexing movement. These station units are a bottom breaker unit 144, a plurality of heater units 145, 146, 147, a bottom closing unit 148, and two bottom sealing units 149, 150. Both the mandrel assembly and the station units are supported on a relatively heavy upright frame panel 151 within the machine base.

The mandrel assembly (FIGS. 3-6, 17) comprises a relatively large diameter shaft 152 journaled in an appropriate bearing 154 carried by the frame panel 151. One end of the shaft 152 has fixed thereto a large bell shaped hub 155. In the present instance, the hub 155 has ten equally spaced hollow projecting stubs 156 into which the inner ends of the mandrels are inserted and the mandrels fixed in place.

One of the important features of the present invention relates to the provision of means for supplying fluid coolant to the mandrels 102 to cool the end faces of the latter and thereby preclude adhesion with the bottom closure parts of the carton 51 being formed thereon. In keeping with this invention, water or other suitable fluid coolant is circulated through interior passages 157 of end caps 158 on all mandrels 102. As herein shown in FIGS. 3 and 4, the coolant fluid system contemplates supply of fluid to pairs of mandrels 102 each pair having supply and return tubes 159, 160 respectively and a U-shaped connecting tube 161. Accordingly, the further description will be confined to the arrangement in one such pair of mandrels and it will be understood that the same arrangement is found in the other mandrel pairs so that the end face of each mandrel 102 is cooled.

Also referring to FIG. 5, each mandrel 102 is square in cross section to slidably receive the tubular carton blank 51. One side of the mandrel, the side visible in FIG. 5, for example, is provided with a radially extending groove 164 having a deeper center channel 166 in which either the supply or return tube 159, 160 lies along with one leg of the U-shaped connecting tube 161 associated with the particular mandrel. An elongated plate 165 is fixed in place within the groove 164 over the tubes 159, 161. The outer ends of the tubes of each mandrel project through a mounting plate 167 which is fastened to the end of the mandrel 102 and is interposed between the mandrel and the end cap 158. The tubes are fixed to the mounting plate 167 with the extremities of the tubes cut off to allow flow of fluid between the tubes and the interior passage 157 of the end cap 158. The passage 157 in each end cap 158 is crescent shaped in communication at one end with either the supply or return tube and at the other end with the connecting tube to provide for circulation of fluid coolant.

Where the supply or return tubes 159, 160 enter the base of the mandrel 102 they are bent at right angles for fastening to fittings 170, 172 carried by an annular plate 174 fixed to the rotary hub of the mandrel assembly for turning with the latter. This annular plate carries the fittings for each water tube assembly and is rotatable adjacent a water slip-ring 175 which is piloted on the shaft 152 by a member 176. The water slip-ring 175 is held against rotating by a bar 180 supported by a bracket 182 fixed to the machine frame 151. The pilot member 176 and plate 174 are fixed to each other and to the mandrel hub by means such as machine screws 183, permitting the mandrel hub to turn without restriction within the fixed slip-ring. As shown in FIG. 5, the face of the slip-ring abutting the annular plate 174 is provided with a pair of concentric water conveying grooves 188, 190 one of which is connected to the pressure side of a coolant fluid system such as a water system via the supply conduit 191 and the other of which is connected to the return side of the system via the conduit 192. Other annular grooves 193, 194, 195 in the plate receive sealing rings. With this arrangement, it will be understood, coolant fluid is supplied from the pressure groove 188 of the fixed coolant slip-ring 175 to the supply tube 159 of the mandrel coolant tube assembly via a passage 198 in the plate 174 and the fitting 170. After this coolant is circulated through the end cap 158-1 on the first mandrel, and conveyed to the end cap 158-2 on the second mandrel by the connecting tube 161, the coolant is returned to the return groove 190 of the coolant slip-ring 175 via the return tube 160, fitting 172 and a passage 199 in the plate. Similar fittings 170, 172 are spaced equally around the annular plate 174, one set for each pair of mandrels 102 and each fitting set is connected by passages 198, 199 to the pressure and return grooves 188, 190 of the plate. This arrangement thus provides for the continuous circulation of coolant from the coolant system to each mandrel of the rotary assembly thus permitting the coolant to be replenished and cooled to maintain the end caps on the mandrels contacting the bottom closure parts at a suitable low temperature to prevent adhesion. Power for driving the mandrel assembly with a step-by-step indexing motion is furnished by any suitable drive mechanism such as from the main drive motor 202 of the machine via chain and sprocket drive 204 and main drive shaft 206 as shown in FIG. 17. The latter has fixed thereon a barrel cam 208 the track of which receives follower rollers 210 carried by the hub of the mandrel assembly as shown best in FIGS. 5 and 17. The track of cam 208 includes sufficient dwell so that the hub, through its follower rollers 210, is given an intermittent angular motion.

Figure 3:
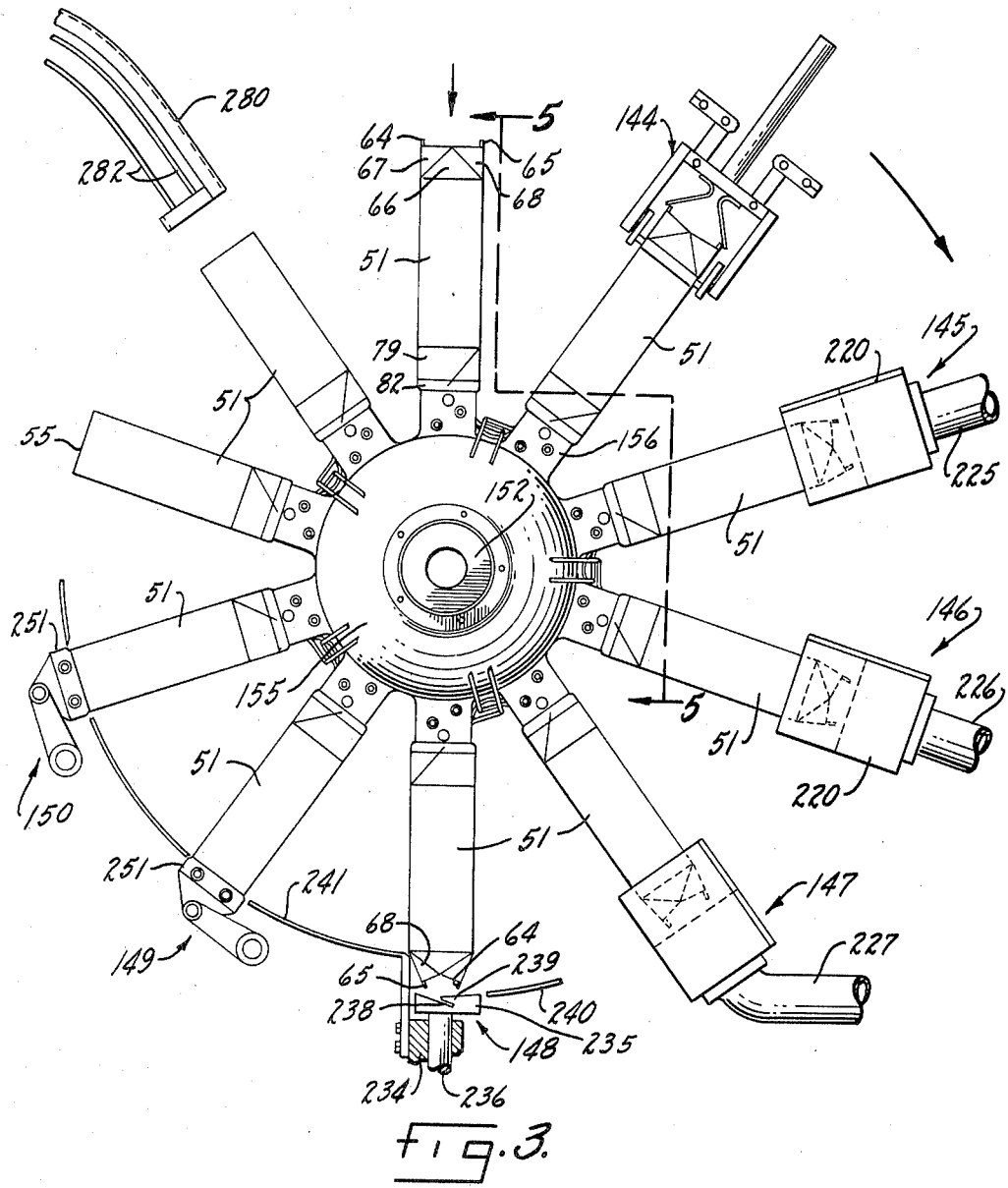
FIG. 3 is an end elevational view of the mandrel wheel assembly of the machine including various associated units for operating on the carton at different stations along its path of movement.

Following the loading of an open-ended carton blank 51 on a mandrel 102 by the loader mechanism, top down, the mandrel assembly moves the blank through an indexing step, thereby bringing the blank into register with the bottom breaker unit 144 (FIG. 3). Details of a suitable breaker unit 144 are fully disclosed in copending application Serial No. 67,842, filed November 7, 1960, now Patent No. 3,120,089, entitled "Machine for Forming Plastic Coated Paperboard Containers." In this position, all the bottom closure panels overhang the end of the mandrel and the common score line connecting them to the carton side panels is approximately even with the end face of the mandrel. The major bottom panel 65 is in leading position and the other major bottom panel 64 is in trailing position with respect to the directon of mandrel movement. Minor triangular panels 66, 67 and 68 face toward the water slip ring 175, while minor triangular panels 69, 70, 71 face away from the slip ring.

The bottom breaker unit 144 is adapted to effect substantial prebending of the bottom closure parts on their respective score lines and toward their closed position. The prebending action is carried to a sufficient extent to create along each score line, insofar as possible, a permanent set in the paperboard and its thermoplastic coating. This greatly facilitates the subsequent closing and sealing of the bottom closure elements of the blank.

Following the bottom breaking operation, the mandrel assembly indexes the carton 51 around the heater stations 145, 146 and 147. In order to avoid overheating of the bottom with possible damage to the paperboard or the thermoplastic coating, and yet drive sufficient heat into the bottom closure panels to achieve effective sealing, resort is had to a series of heating stations, in this instance, three in number (FIGS. 1 and 3). These stations are substantially identical and are adapted to apply warm air to both sides of the bottom closure panels so as to raise their temperature sufficiently to activate the adhesive action of the thermoplastic coating on the carton blank. Where polyethylene is used as such coating, the temperature of the blank must be increased to approximately 350 to 500 degrees Fahrenheit.

As shown more particularly in FIGS. 1 and 3, each heater station comprises a hollow boxlike heater head 220 fixed to the main frame panel and adapted to nestingly straddle the radially projecting bottom closure panels of the carton 51 as it is held in position by an underlying registered mandrel. For details of the head construction reference may be made to the above identified copending application, Serial No. 67,842.

Air is supplied to the heater heads 220 from a blower 221 mounted near the lower right corner of the frame panel 151 as viewed in FIG. 1. The blower 221 discharges into a vertical manifold 222 which connects at vertically spaced points with three separate combustion chambers 224. The latter are connected to respective ones of the heads 220 via individual supply ducts 225, 226 and 227 which communicate respectively with the plenum chamber of each head. Combustion is, of course, carefully controlled so as to be as complete as possible. With an excess of air (as far as the burner is concerned) supplied to the burner of each combustion chamber, the combustion products mix with the excess air in the combustion chamber, resulting in the discharge of a blast of heated air at each heater head 220 having, in the present instance, a temperature of about 800 degrees Fahrenheit. By the time the blank 51 is ready to leave the last heater station 147, its bottom closure panels have been heated to a temperature of 350 to 500 degrees Fahrenheit and are ready for closing and sealing.

After the heating operation, the mandrel assembly indexes and carries the blank 51 from the last heater unit 147 to the bottom closing unit or station 148 (FIG. 1). At this point, the bottom closure panels have been heated to a temperature sufficient to activate the adhesive action of their thermoplastic coating. In such condition, the particular coating used on the blank 51 will adhere to itself and to hot surfaces but not to cold surfaces of other material.

The bottom closing unit 148 (FIGS. 1 and 3) comprises a support block 234 fixed to the lower portion of the frame panel 151. The support block carries a closer shoe 235 and its guide plunger 236, both mounted for reciprocation approximately along a projection of the radius of the registered mandrel. The upper face of the closer shoe 235 is concave in a direction transverse to the plane of rotation of the mandrel assembly, such shape being defined by two angular surfaces. One such surface is undercut with respect to the other, defining a transverse slot 238 and a wedge-shaped tuck-in blade 239 in the central portion of the shoe. Upon elevation of the shoe 235 toward the mandrel, the slot 238 is adapted to engage the projecting end of the major bottom panel 65. At the same time, the blade 239 is adapted to engage the major bottom panel 64 and to tuck it into the space between the inner face of the panel 65 and the adjacent triangular fold-back panels 68, 70. The shoe 235 dwells in elevated position for a sufficient interval to permit withdrawal of the panel 65 of the closed, tucked-in bottom from the slot 238 as an incident to the next step of indexing movement of the mandrel assembly.

For the purpose of assuring proper orientation of the bottom closure panels on entering and leaving the closing station 148, the latter is equipped with fixed arcuate guides 240, 241. The guide 240 is disposed to prevent jamming or tearing of the free lower end of the bottom panel 64 against the edge of the shoe 235 when the same is in lowered position. The guide 241, on the other hand, is arranged to hold the closed bottom in that condition as the mandrel assembly moves it from the raised shoe 235 to the sealing station 149. Provision is made for driving the closer shoe 235 to reciprocate in properly timed relation to the mandrel assembly. Provision may also be made for cooling the closer shoe 235 to prevent sticking of the heated coated bottom closure panels to it.

From the bottom closing unit 148, the blank 51 next passes to the bottom sealing units 149, 150. The latter are substantially identical and, in this instance, two such units are used in order to subject the bottom closure to pressure for the necessary total interval of sealing time. As illustrated in FIG. 3, each sealing unit comprises a pressure pad 251 having fluid coolant circulating therethrough. Each pressure pad is pivotally supported and power operated to move through a relatively short displacement between a pressure applying position where it squeezes the bottom closure panels against the end face of the mandrel, causing them to assume the closed condition and an inactive position spaced farther away from the end face of the mandrel. The pivotal mounting tends to give each pressure pad a limited amount of float, permitting it to accommodate readily to the bottom closure elements of the blank 51 as it presses them against the end face of the mandrel.

*Transfer mechanism*

After the bottom seal is completed, the mandrel assembly indexes through another step and carries the blank 51 to a transfer station which, as indicated in FIG. 3, is one step short of the loading station. At the transfer station, the mandrel and blank 51 are upwardly inclined and the bottom closure occupies a radially outward position on the mandrel. The blank 51 is hereupon ejected from the mandrel by means herein shown as air pressure jets emitted from ports 266 in the end of the mandrel. Air passages 267 in the mandrel convey high pressure air from a source to the ports, and the supply of air to the mandrel is controlled so that the carton is ejected after the mandrel has been indexed to the transfer station.

While machines such as the one disclosed herein have formed cartons with uniformly high sanitary integrity, there may be some instances where a sanitizer unit is desired by the user or required by local heath regulations. Such a unit may be located adjacent the mandrel assembly so as to receive a carton ejected from the mandrel at the transfer station. In the present case, for convenience of description, the sanitizer unit is not shown but the carton after ejection from the mandrel is transferred directly to the conveyor which moves the carton through the machine for filling and top closing operations. It will be understood that where such sanitizer is required and is located adjacent the mandrel assembly, each carton after being plunged in boiling water or exposed to germicidal lamps according to the type of unit employed, will be conveyed directly to the conveyor mechanism.

As herein shown, the carton 51 is conveyed directly from the mandrel assembly to the conveyor mechanism through an elevated open work trackway or slide 280 defined by parallel spaced rods 282. The air blast ejecting the carton 51 from the mandrel causes the carton to move bottom first up a slight incline in the trackway over the peak of the latter from where it will slide down the opposite slope to the delivery station 283 at the end of the chain conveyor. The terminal portion 284 of the trackway is substantially vertical so that the carton is delivered upright to the conveyor and in position to be filled.

*Top breaker unit*

Figure 7:
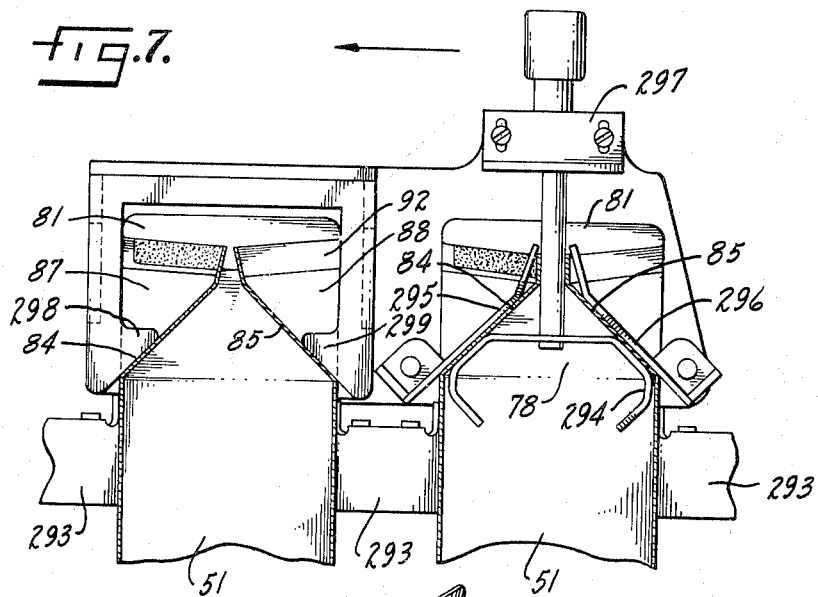
FIG. 7 is an enlarged fragmentary vertical sectional view through the upper portion of the carton and a top breaker and steepler unit.
Figure 8:
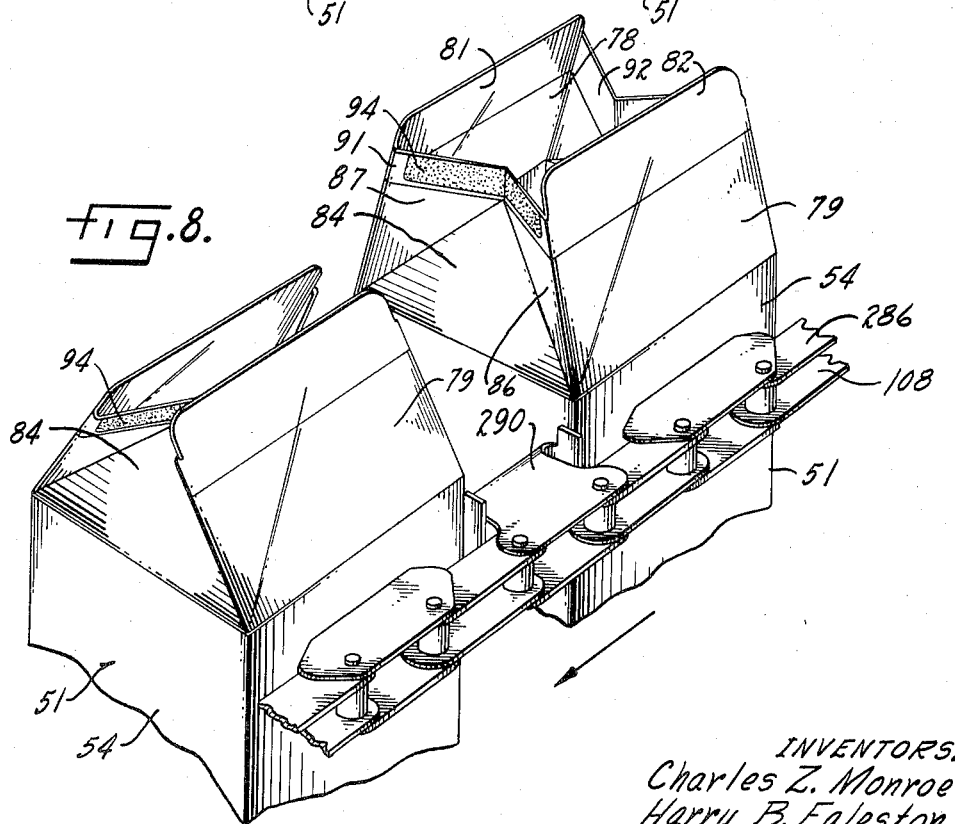
FIG. 8 is an enlarged fragmentary perspective view showing the upper portion of two cartons with the right-hand one in the top breaker mechanism and the left-hand one in the steepler mechanism.

Turning now to FIGS. 7, 8 and 15 it will be noted that in this case the conveyor 108 is a chain type comprising upper and lower chain courses 286, 288 extending horizontally above a slide along which the cartons 51 are moved by the chains. Each carton is engaged at spaced upper and lower points by fingers or plates 290, 292 fixed to links of the upper and lower chains, respectively. The chains are trained over sprockets and supported by suitable guides and power driven to move the cartons in step-by-step fashion through the mechanisms of the machine. In addition, a similarly driven single chain course is provided on the opposite side of the cartons, having carton gripping fingers 293, so that the cartons are engaged on both sides by chain supported fingers. This conveyor arrangement, however, is illustrative only and may be varied as desired.

Each carton 51 upon delivery at the end of the conveyor through the terminal portion 284 of the elevated trackway, accordingly, is engaged by chain supported fingers 290, 292, 293 and movable toward the filler unit: that is, from right to left in FIG. 1. As described above, the top closure end of each container comprises a plurality of panels defined by score lines which define boundaries of the interconnected panels. Included among the panels are a pair of outer roof panels 78, 79 and inner triangular panels 84, 85. It has been found to be advantageous to effect a preliminary top closing operation just prior to the introduction of the charge of liquid which the container is to retain. The primary purpose of this preliminary top closing is to break the score lines and facilitate the completion of the closure after the container is filled. One illustrative mechanism for carrying out such a preliminary top closing action is shown in U.S. Patent No. 2,410,587 to C. Z. Monroe. The disclosure of this patent is incorporated by reference herein, but for the present purposes a brief description of this mechanism will be given. Essentially, the preliminary closing mechanism comprises a mandrel 294 which is insertable into the container body during the breaking and so positioned therein as to insure that the closure is made along the score lines. Operatively associated with the mandrel are a pair of opposed generally triangular folding fingers 295, 296 which engage the triangular infold panels 84, 85 of the container closure. To effect a partial closing, the mandrel 294 is lowered into the open mouth of the container and the triangular fingers 295, 296 swing downwardly and inwardly against the mandrel to give a preliminary bend to the score lines defining the triangular top closure panels. The mandrel and fingers are mounted for vertical movement on an appropriate support 297 and are actuated by any suitable means including a cam secured to the main cam shaft of the machine so that the partial closing mechanism is operated in synchronism with the remainder of the machine and with the movement of the conveyor.

In order to insure that the score lines defining the top closure are fully broken or bent, means are provided for completing the closure but without sealing the flaps together. One illustrative means for accomplishing this purpose comprises a steepler including a set of outwardly and downwardly inclined steeple plates which engage the roof panels (not shown in FIG. 7) and fingers 298, 299 between such plates (FIG. 7) such elements being supported on the bracket mounting the mandrel and finger mechanism of the top breaker. The steepler provides a second preclosing operation on each container. This second preclosing operation serves particularly to insure that the score lines defining the upstanding rib panels are given a prebend, thereby avoiding difficulty in later closing the filled container.

*Filler*

From the preclosing mechanism, the open containers are carried by the conveyor to a filling mechanism of any conventional type and indicated generally at 302 (FIG. 1). Such mechanism operates to fill a predetermined charge of milk or other product into the open topped containers. Associated with this filling mechanism may be appropriate auxiliary devices such as defoamers and the like. Again, the containers are carried by the conveyor through the filling mechanism in a step-by-step manner, and the filling mechanism operates in synchronism with the conveyor.

*Top closure heater*

It will be appreciated from the above description of the container that the top closure flaps thereof are coated on both sides with a thermoplastic material such as polyethylene. Accordingly, in accordance with another aspect of the present invention, means are provided for heating the surfaces of the top closure ribs and for pressing these heated surfaces together to effect a seal of the container closure. As described in connection with the bottom sealing mechanism, it is necessary to heat the closure flaps to a sufficiently high temperature to insure that the polyethylene is fused without destroying its integrity as a film and to further insure that the closure elements remain hot enough for a sufficient length of time to permit the flaps to be closed and pressed together. Accordingly, an appropriate mechanism is provided for heating the inner surfaces of the upstanding ribs on the closure panels and subsequently for closing the panels so that the heated rib portions are in juxtaposed relation and finally for applying a sealing force to sealingly press the closure ribs together and thereby form a liquidtight top seal on the container.

In the present case, the top heater 112 is mounted over the conveyor 108 to the left of the filler unit 302 as viewed in FIG. 1. Turning also to FIGS. 9–12, the top heater 112 includes a hollow inverted trough head 310 mounted in immediate juxtaposition to the tops of cartons being conveyed from the filler unit. As shown in FIG. 12, five plates 310–1 to 310–5 make up the under side of the head 310 which is longitudinally aligned with the conveyor. Each plate defines a station at which filled containers will come to rest as they move under the heater head toward the top closure and sealer units 114, 115. The location of the rib panels of a container at rest at such a station beneath a head plate 310–1, is shown in phantom lines in FIG. 11. Passages 313 and 313″ are provided in the flat center wall section 314 of the plate and passages 315, 316 are provided in the sloping side walls 317, 318 of the plate for discharging heated streams of air from a plenum chamber 320 within the head against the surfaces of the rib panels 81, 82 and 90–93, of the carton top closures.

As a feature of this invention, such passages are arranged in each plate 310–1 to 310–5 so that the streams of air discharged therefrom against the rib panels are directed away from the lip 94 of adhesive material located on inner rib panels 90, 91, and toward these areas of the carton panels which will be fused. To this end, as shown diagrammatically in FIGS. 11 and 11a, those passages 313 in the forward part of the plate center section are inclined outwardly to discharge air therefrom diverging from the center toward the sides of the head and away from the lip 94. The nozzle passages 315, 316 in the sloping plate side walls are similarly arranged so as to discharge downwardly and outwardly diverging streams of heated air on the inner faces of the outer rib panels 81, 82. These diverging streams are also applied on small areas of the inner rib panels 92, 93 where they are adjacent to the outer rib panels 81, 82, respectively, and farther on the small areas of the inner rib panels 91, 90 not covered by lip 94 where they are adjacent to the outer rib panels 81, 82, respectively. The passages 313′ and 313″ in the rearward part of the plate center section are, on the other hand, mutually inclined in a direction longitudinally of the head so as to discharge streams of air away from the lip 94 and directly upon the inner and outer faces of inner rib panels 92, 93 across from the lip.

Air is supplied to the plenum chamber 320 from a blower 322 mounted toward the back of the frame panel 151 as viewed in FIG. 1. The blower 322 discharges through an elbow 324 into a combustion chamber 326 which is connected through a hinged fitting 328 to the plenum chamber. An igniter and a gas burner is also included in the combustion chamber supplied with gas and controlled through a fitting 329. Combustion is, as in the case above described of the bottom heater adjacent the mandrel assembly, carefully controlled to be as complete as possible. The combustion products mix with the excess air in the combustion chamber resulting in the discharge of a blast of heated air from the nozzles of the head.

To provide access to cartons on the conveyor the heater head is mounted to be pivoted on the hinge 328 between the lower operative position of FIG. 9 and a raised position where it is tilted back toward the blower 322. A cover 330 over the heater head with insulation 332 packed in the cavity or an air space between the cover and the top wall of the head provides a safeguard against injury of persons at the machine. As shown in FIG. 12, one end of the cover 330 rests on a bridge member 333 extending across the machine while the opposite ends rests on a part 334 of the unit adjacent the top closer heater.

*Top closer and sealer*

Once enough heat has been driven into the top closure elements to fuse the polyethylene thereon, the containers pass through a top closer or first station sealer 114 and a second station sealer 115 which engages the outer surfaces of the container ribs and roof panels and urges them together to a closed position, and seals them. This closing operation is facilitated, as pointed out above, by the preliminary closing carried out before the container is filled.

Turning now to the top closer unit 114, from FIGS. 12 to 14 it will be seen that the latter is mounted immediately following the top closure heater 112. This unit comprises a fixed jaw 336 and a movable jaw 338 disposed in longitudinally aligned, overlying relation with the carton path. The jaws 336, 338 have tapered extensions at their leading ends (FIG. 13) which straddle the top of the carton 51 as it emerges from the heater 112. The jaws converge in the direction of movement of the carton on the conveyor 108, camming against the roof panels and top rib panels and ultimately bringing them together in a closing tunnel 340 of inverted Y-shape (FIG. 14). The tunnel 340 is proportioned so as to afford a relatively close sliding fit with the top closure members of the carton as it passes thereunder.

In order to preclude sticking and possible build-up of thermoplastic coating on the closing jaws 336, 338, they may be supplied with fluid coolant via suitable internal passages and inlet and outlet connections 342 (FIG. 13).

With the top closure members in the tunnel 340, the movable jaw 338 is moved to apply a pressure to the upstanding ribs and sealing flaps of the container for the purpose of sealing them together. The movable jaw 338 is then released so that each carton may be moved to the second station top sealer unit 115. This sealer unit applies a further pressure to the upstanding ribs and sealing flaps of the container for the purpose of sealing them together. The polyethylene coating on the inner surface of the ribs, being tacky from passing under the heater head, adheres to the polyethylene surface on the opposite rib and forms a polyethylene-to-polyethylene bond. The seal thus formed is exceptionally strong and liquid tight. One illustrative pressure sealing mechanism is shown in U.S. Patent No. 2,212,449 and is capable of applying a sufficiently heavy pressure so that the various plies or panels comprising the closure rib are closely pressed together and the fused polyethylene is caused to flow and occupy the spaces and crevices intermediate the several panels which might otherwise serve as ducts or passages for the escape of liquid.

The second station sealer unit comprises spaced container rib engaging jaws 346, 348, one of which 346 is stationary and the other of which 348 is movable. The stationary one of these jaws 346 (shown on the left in FIG. 15) forms a continuation of the adjacent stationary closer jaw 336.

A mechanism such as shown in FIG. 15 is employed to operate the movable jaws 338, 348 of the first and second station sealers 114, 115. Such mechanism comprises a bridging member 344 the ends of which are supported on the side frame members 151 of the machine. Such movable jaws 338, 348 are supported on the bridging member. These movable sealer jaws are secured to the forward end of a slide 350 by an appropriate means such as screws or the like. The slide 350 is in the form of a longitudinally slotted flat plate, the slot being shown at 352, for receiving the flattened lower end of a stud 354 secured to the frame. Housed within the slot 352 and bearing against the end of the slot and against the stud is a coiled compression spring 356 which acts to project the slide to the right as shown in FIG. 15 to create a space wide enough to slidingly receive the closure rib of a carton.

For operating the slide by urging it to the left thereby to press the movable jaws 338, 348 into engagement with the closure rib of a carton in the sealer unit there is provided a vertically extending lever 358 having at approximately its midpoint a roller 360 engaging the head of a bolt 362 fixed to the slide 350. At its upper end the lever 358, which is preferably of the bifurcated type, is pivotally connected to an enlarged intermediate portion of a slidable rod member 364.

At its lower end, the lever 358 is provided with a roller 366 which bears against the periphery of the cam 368 fixed upon the cam shaft 370. The cam is shaped so that the slide 350 is given a preliminary rapid movement toward a container rib which is positioned to be acted upon, followed by a relatively slow final movement as the face of the movable jaw comes into contact with the container rib so that the rib is subjected to a heavy pressure during a short travel of the jaw. This heavy pressure occurs as a result of the helical coil spring 372 acting against the rod member 364 at the upper end of the lever 358. For a more detailed description of this pressure mechanism, reference should be made to the aforementioned Patent No. 2,212,499.

To insure that the container is tightly sealed it is engaged by the pressure pads at two dwell positions, that is, the container ribs are pressed together and when the container indexes one step forward the ribs are again pressed together. From this final sealing step the containers are discharged to an appropriate loading conveyor mechanism or loading table.

If desired one or both of the jaws of the closer and sealer units may be coated with a layer of tetrafluoroethylene containing coating material in order to reduce the possibility of their sticking to the hot polyethylene coating on the closure flaps. With the provision of means for cooling the closer jaws it has been found that the cold metal thereof and of the adjacent sealer unit jaws do not stick to the polyethylene, although suitable cooling coils may be provided in the stationary sealer unit jaw 346 if found desirable.

After being moved by the conveyor 108 from between the jaws of top sealer unit 115, the filled and fully sealed cartons 52 are received and passed through a subsequent section of the sealer which includes a top cooler unit 374 serving the function of completing the cooling of the fused plastic on the top closure elements thereby insuring the integrity of the plastic seal. Referring to FIG. 16 the top cooler unit comprises an elongated box-like member having a slot 376 extending lengthwise the full length of the member along its under surface. The slot 376 has sufficient width to receive the top ribs of the cartons as they move from the top sealer unit and has sufficient length to cool the top closure parts adequately for the purpose stated. As herein shown the unit is long enough to receive about three cartons 52 at a time so that with the cartons being moved in step-by-step fashion by the conveyor 108 each carton will remain in the unit for three stages of such movement.

The unit has interior passages through which coolant is circulated through fittings 378, 380 to hold the unit at the required low temperature.

After leaving the top cooler unit 374, the filled cartons 52 are moved by the conveyor to a delivery section from which the cartons may be packed or cased as desired.

*Machine drive*

Referring particularly to FIG. 17 for completing the disclosure of this packaging machine details of the drive for certain of the components above described are shown. The main drive motor 202 as shown in this figure is connected by suitable means shown as a chain and sprocket drive 204 to the main drive shaft 206 which has fixed thereon barrel cam means 208. The track of the latter receives follower rollers 210 carried by the hub of the mandrel assembly (FIG. 5) and gives the latter an intermittent angular motion. The main drive motor 202 will also supply power to the bottom breaker 144 as well as the bottom closer 106 and presser plates 149, 150 associated with the mandrel assembly. Separate power means will be provided for the steepler and top breaker 107, 111, top closure sealer 115, and for the conveyor 108. Suitable control instrumentalities will be included to start, stop and co-ordinate the different mechanisms.

We claim as our invention:

1. In a machine for forming gable top cartons from thermoplastic surface blanks having certain top closure panels which are heat sealable and other top closure panels defining a pouring spout which are adapted to be held in adjacent relation without being sealed together in a closed completed carton, the combination comprising, a carton conveyor along which filled open topped cartons are moved, a gas heater having a hollow head with a substantially horizontal underwall overlying said conveyor and disposed along a part of the path thereof in intermediate juxtaposition with top closures of cartons moved along said conveyor, means defining a combustion chamber and a plenum chamber for supplying heated air to the interior of said head, said head underwall having means therein defining one group of passages arranged to direct streams of heated air from the interior of said head through said one group of passages and toward the center of said conveyor against top closure panels adapted to be sealed, and having other means in said head underwall defining another group of passages arranged to direct streams of heated air from the interior of said head through said another group of passages and diverging from the center of said conveyor toward the lateral edges thereof away from the pouring spout defining top closure panels and toward the top closure panels adapted to be sealed, and means including a pivotal connection between said plenum chamber and said combustion chamber for permitting said plenum chamber and said head to be tilted upwardly away from said conveyor so as to rest on said combustion chamber.

2. In a machine for forming gable top cartons from thermoplastic coated blanks having certain top closure panels which are heat sealable and other top closure panels defining a pouring spout, the combination comprising, a carton conveyor along which filled open topped cartons are moved in step-by-step fashion, a gas heater having a hollow head with a substantially horizontal underwall overlying said conveyor and disposed along a part of the path thereof in immediate juxtaposition with top closures of cartons moved along said conveyor, means defining a combustion chamber, means for supplying air under pressure to said combustion chamber, means including a plenum chamber for conducting heated air from said combustion chamber to the interior of said head, means including a pivotal connection between said combustion chamber and plenum chamber permitting said heater head to be tilted upwardly away from said conveyor, said substantially horizontal head underwall having a plurality of sections at which each carton comes to rest in its step-by-step movement, each said head section having means therein defining downwardly directed passages grouped to direct heated air from the interior of said head and through said passages against said heat sealable top closure panels for heating the thermoplastic coating on the latter preliminarily to sealing and to direct heated air to portions only of other top closure panels defining the pouring spout to avoid heating the thermoplastic coating on other portions of said last-mentioned panels.

3. In a machine for forming gable top cartons from blanks having thermoplastic material on the surfaces thereof, each said carton having certain top closure panels which are heat sealable and other top closure panels defining a pouring spout, the combination comprising, a carton conveyor along which filled open topped cartons are moved, a gas heater having a head overlying said conveyor and disposed along a part of the path thereof in immediate juxtaposition with top closures of cartons moved along said conveyor, said head having a first means grouped to discharge heated air downwardly therefrom against the surfaces of closure panels of cartons on said conveyor with said heated air from said first means being directed against certain of said top closure panels for heating the thermoplastic coating on the latter preliminary to sealing by means of said thermoplastic material and having a second means grouped to discharge heated air downwardly therefrom against portions only of said other top closure panels defining the pouring spout therein to avoid heating the thermoplastic material on other portions of said last-mentioned panels.

4. In a machine for forming gable top cartons from blanks having thermoplastic material on the surfaces thereof, each said carton having top closure panels defined therein with certain of said top closure panels being adapted to be sealed together by means of said thermoplastic material and other top closure panels defining a pouring spout being adapted to be held in adjacent relation without being sealed together in a closed completed carton, the combination comprising, a carton conveyor for moving filled open topped cartons in step-by-step fashion, and a gas heater having a head overlying said conveyor and disposed along a part of the path thereof in immediate juxtaposition with top closures of cartons moved by said conveyor, said head having a plurality of sections at which each carton comes to rest in its step-by-step movement, each said head section having means therein defining downwardly directed passages grouped to direct heated air from said head directly against top closure panels adapted to be sealed for heating the thermoplastic material on the latter preliminary to sealing and to direct heated air to portions only of other top closure panels defining the pouring spout to avoid heating the thermoplastic material on other portions of said last-mentioned panels.

5. In a machine for forming gable top cartons from blanks having thermoplastic material on the surfaces thereof and having top closure panels defined therein, some of said top closure panels being adapted to be sealed together by means of said thermoplastic material and other top closure panels defining a pouring spout and being adapted to be held in adjacent relation without being sealed together in a closed completed carton, the combination comprising, a carton conveyor for moving filled open topped cartons in step-by-step fashion, and a gas heater having a head overlying said conveyor and disposed along a part of the path thereof in immediate juxtaposition with top closures of cartons moved by said conveyor, said head having a plurality of sections at which each carton comes to rest in its step-by-step movement, means in each said head section defining opposed groups of downwardly converging discharge passages constructed and arranged to direct streams of heated air toward said conveyor and against certain of said top closure panels adapted to be sealed, and means defining diverging groups of discharge passages constructed and arranged to direct streams of heated air diverging from the center of said conveyor and said other top closure panels defining the pouring spout therein and against the remaining of said top closure panels adapted to be sealed.

References Cited by the Examiner
UNITED STATES PATENTS

| | | | |
|---|---|---|---|
| 2,212,472 | 8/1940 | Hartmann | 93—44.1 |
| 2,357,535 | 9/1944 | Monroe | 93—44.1 |
| 2,697,313 | 12/1954 | Wilcox | 53—29 |
| 2,823,729 | 2/1958 | Stickelber | 53—388 |
| 2,841,942 | 7/1958 | Wills et al. | 53—375 |
| 2,869,626 | 1/1959 | Sherman | 263—19 X |
| 2,903,833 | 9/1959 | Jones | 53—375 |
| 2,993,419 | 7/1961 | Currie | 93—44.1 |
| 3,002,328 | 10/1961 | Monroe et al. | 53—375 X |
| 3,028,798 | 4/1962 | Allen | 93—39.1 |

FRANK E. BAILEY, *Primary Examiner.*

ROBERT A. LEIGHEY, TRAVIS S. McGEHEE,
*Examiners.*